US008059809B1

(12) United States Patent
Zhang et al.

(10) Patent No.: US 8,059,809 B1
(45) Date of Patent: Nov. 15, 2011

(54) SYSTEMS AND METHODS OF ESTABLISHING GROUP CALLS

(75) Inventors: Qiang Zhang, Fairfax, VA (US); Jing Qu, Reston, VA (US); Ramesh Kalathur, Fairfax, VA (US)

(73) Assignee: Nextel Communications Inc., Reston, VA (US)

( * ) Notice: Subject to any disclaimer, the term of this patent is extended or adjusted under 35 U.S.C. 154(b) by 1110 days.

(21) Appl. No.: 11/687,366

(22) Filed: Mar. 16, 2007

(51) Int. Cl.
*H04M 3/42* (2006.01)
(52) U.S. Cl. .................. 379/211.04; 379/211.01
(58) Field of Classification Search ............ 379/211.01–211.04, 207.01, 202.01, 158
See application file for complete search history.

(56) References Cited

U.S. PATENT DOCUMENTS

| | | | |
|---|---|---|---|
| 6,385,461 B1 * | 5/2002 | Raith | 455/518 |
| 6,624,809 B1 * | 9/2003 | Kowaguchi | 345/169 |
| 6,625,652 B1 * | 9/2003 | Miller et al. | 709/227 |
| 2003/0028594 A1 * | 2/2003 | Laschkewitsch et al. | 709/204 |
| 2003/0148779 A1 * | 8/2003 | Aravamudan et al. | 455/519 |
| 2003/0152040 A1 * | 8/2003 | Crockett et al. | 370/260 |
| 2003/0153343 A1 * | 8/2003 | Crockett et al. | 455/519 |
| 2004/0013254 A1 * | 1/2004 | Hamberg et al. | 379/202.01 |
| 2004/0064512 A1 * | 4/2004 | Arora et al. | 709/206 |
| 2004/0093433 A1 * | 5/2004 | Armbruster et al. | 709/247 |
| 2004/0203977 A1 * | 10/2004 | Kennedy | 455/518 |
| 2005/0233776 A1 | 10/2005 | Allen et al. | |
| 2006/0009249 A1 | 1/2006 | Fu et al. | |
| 2006/0053208 A1 | 3/2006 | Laurila et al. | |
| 2006/0256734 A1 * | 11/2006 | Erhart et al. | 370/254 |
| 2007/0186002 A1 * | 8/2007 | Campbell et al. | 709/231 |
| 2008/0183866 A1 * | 7/2008 | Maeda et al. | 709/224 |
| 2009/0157732 A1 * | 6/2009 | Hao et al. | 707/102 |
| 2009/0293069 A1 * | 11/2009 | Yang et al. | 719/318 |
| 2010/0088430 A1 * | 4/2010 | Ton et al. | 709/248 |

* cited by examiner

*Primary Examiner* — William Deane, Jr.

(57) ABSTRACT

Systems and methods of establishing group calls are provided. Contact index information is synchronized between a communication unit and a contact synchronization server. A group call request message, including index information for one or more contacts, is sent from a communication unit to a signaling server. The signaling server uses the index information to obtain communication unit addresses from the contact synchronization server.

15 Claims, 4 Drawing Sheets

| 1 | Contact A |
|---|---|
| 2 | Contact B |
| 3 | Contact C |
| 4 | Contact D |
| 5 | Contact E |
| 6 | Contact F |
| 7 | Contact G |

FIGURE 3

SYSTEMS AND METHODS OF ESTABLISHING GROUP CALLS

BACKGROUND OF THE INVENTION

The explosive growth of communication networks such as the Internet and wireless communication networks has reduced the need to travel for group activities. Instead, group activities are now commonly conducted remotely, using various types of wired and wireless communication networks. There are various techniques for establishing group communications. Originally, group communications were established using a conference call in which the originator of the conference call dialed telephone number of each participant and the originator's communication device would bridge each participant into the conference call. Communication network-based conference bridges are now commonly employed for group communications in which the conference originator distributes a call-in number for the network-based conference bridge, and each participant must call the number of the conference bridge in order to join the group communication.

SUMMARY OF THE INVENTION

Push-to-talk technologies (PTT) such as those provided by the iDEN network or using the PTT over Cellular (PoC) standard, provide a number a different techniques for initiating group communications. One type of PTT group communication is the predefined group call, which involves a globally unique group identifier that is predefined, and stored within the network along with communication unit addresses of the group members. Assignment of the globally unique identifier typically required contacting the network operator to provide communication addresses for each of the group members and waiting for this information to be provisioned in the network along with a globally unique identifier.

Another type of PTT group communication is an ad-hoc group call, which allows a user to form a group "on the fly" and initiate a group call without having to establish a predefined group. Typically, ad-hoc group calls are initiated by transmitting a call setup message that includes a communication address of each group member. This can be a problem, for example, when the group call is initiated from a wireless communication unit. Specifically, in wireless communications bandwidth is a precious resource and each communication address that is transmitted increases the amount of bandwidth required to setup the group call.

Exemplary embodiments of the present invention overcome the above-identified and other deficiencies of conventional systems by employing index information when setting-up group calls. Specifically, index information is synchronized between a communication unit and a contact synchronization server. When a group call request message is sent from a communication unit to a signaling server, the message includes index information. The signaling server communicates with the contact synchronization server to obtain one or more communication unit addresses corresponding to the index information, and the group call is setup using the communication unit addresses.

Other objects, advantages and novel features of the present invention will become apparent from the following detailed description of the invention when considered in conjunction with the accompanying drawings.

BRIEF DESCRIPTION OF THE DRAWING FIGURES

FIG. 3 is a block diagram of an exemplary contact list in accordance with the present invention.

DETAILED DESCRIPTION OF THE PREFERRED EMBODIMENTS

Figure 1:
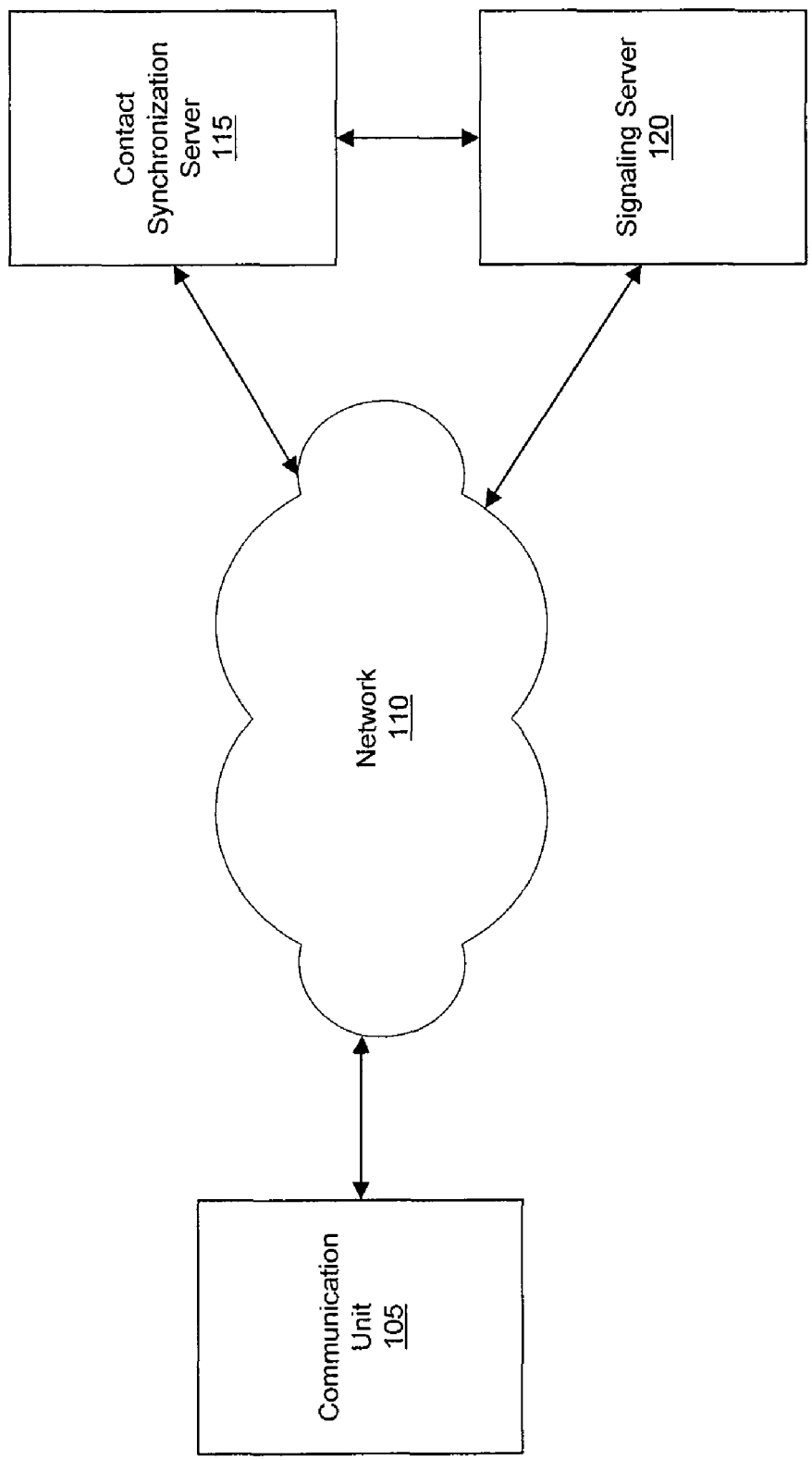
FIG. 1 is a block diagram of an exemplary system in accordance with the present invention

FIG. 1 is a block diagram of an exemplary system in accordance with the present invention. The system includes communication unit 105 coupled by network 110 to contact synchronization server 115 and signaling server 120. Communication unit 105 can be any type of communication unit, including a wired or wireless communication unit, such as a telephone, desktop or laptop computer, personal digital assistant (PDA), and/or the like. Network 110 can be one or more wired and/or wireless networks. Contact synchronization server 115 is coupled to signaling server 120. Contact synchronization server 115 stores and synchronizes information for one or more communication units 105. This information can include contact information such as contact names, one or more communication unit addresses, and can also include tasks, appointments and/or the like.

Signaling server 120 establishes a communication between one or more communication units. In a conventional network, an ad-hoc group call would be established by communication unit 105 sending a list to signaling server 120 with communication addresses of other communication units that are to be part of the group call. Signaling server 120 would then establish the group call with the other communication units that are to join the group call, either alone or in connection with another signaling server. This conventional technique for establishing a group call consumes a large amount of precious air-interface resources, and in communication techniques that limit the size of call setup packets, may require the use of multiple call setup packets which can increase the length of the call setup. For example, a number of communication unit addresses may not be able to fit in a single short data burst (SDB) protocol data unit (PDU) that is used in CDMA2000 and 802.16 networks. Accordingly, as will be described in more detail below, exemplary embodiments of the present invention employ index information stored in both communication unit 105 and contact synchronization server 115 to reduce the amount of information in a call setup message, sent from communication unit 105 to signaling server 120, for setting up a group call.

Figure 2:
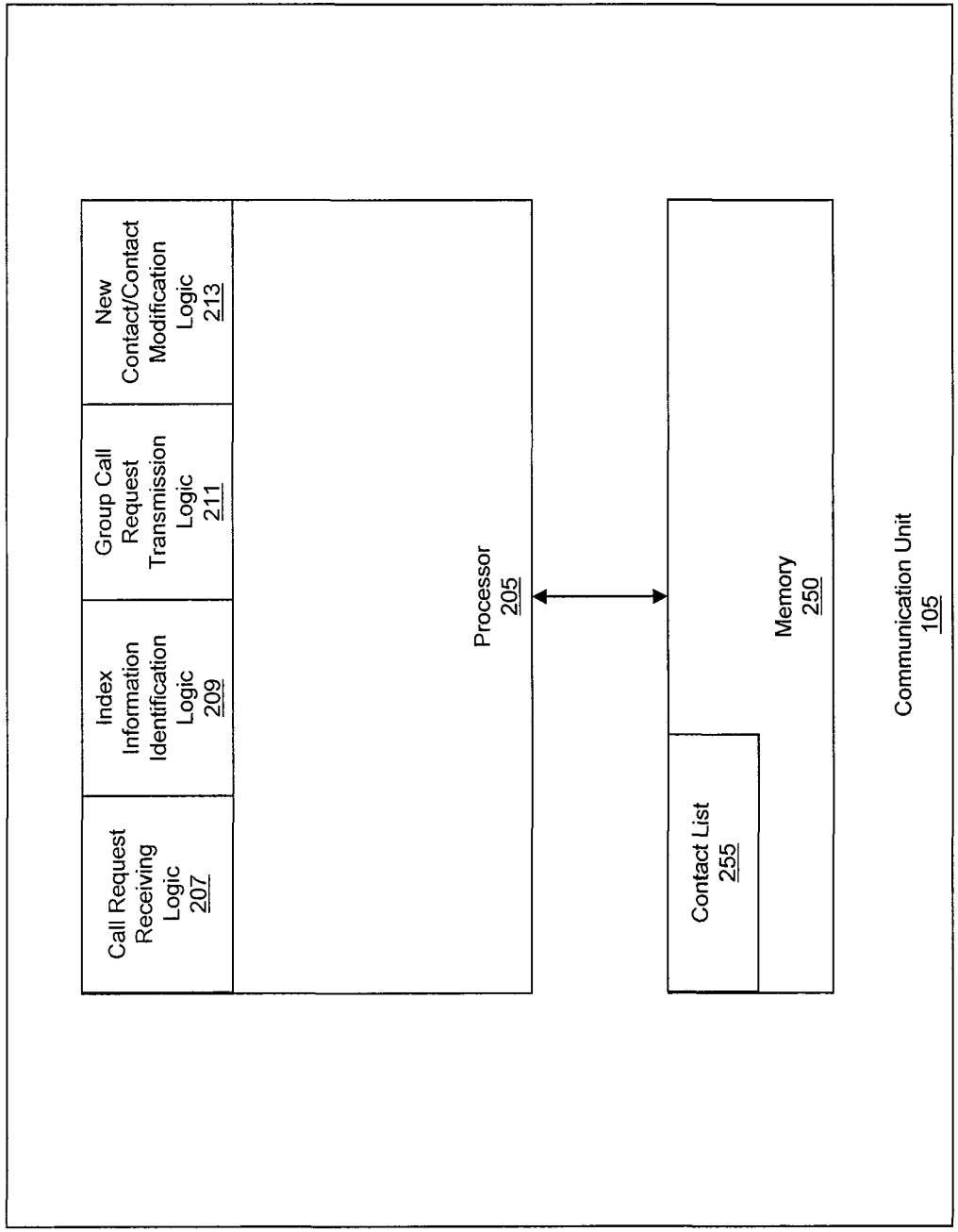
FIG. 2 is a block diagram of an exemplary communication unit in accordance with the present invention.

FIG. 2 is a block diagram of an exemplary communication unit in accordance with the present invention. Communication unit 105 includes processor 205 coupled to memory 250. Processor 205 includes logic 207-213, which will be described in more detail below in connection with FIG. 4. Processor 205 can be any type of processor, such as a microprocessor, field programmable gate array (FPGA) and/or an application specific integrated circuit (ASIC). When processor 205 is a microprocessor then logic 207-213 can be processor-executable code loaded from memory 250. Memory 250 can be any type of memory, and includes, among other information, contact list 255. A copy of contact list 255 is stored in contact synchronization server 115, and when changes are made to contact list 255 in communication unit 105, the changes are synchronized with the list stored in contact synchronization server 115. Similarly, when changes are made to the list stored in contact synchronization server 115, for example from an Internet portal, the changes are synchronized with contact list 255 in communication unit 105.

FIG. 3 is a block diagram of an exemplary contact list in accordance with the present invention. As illustrated in FIG. 3, index information is included for each contact in contact list. The index information can be the contact list slot number or any other hash number. Each contact can include a contact name and telephone number, session initiation protocol (SIP) universal resource identifier (URI), universal fleet mobile identifier (UFMI), and/or electronic mail address. The index information and contact information are stored in both the communication unit and in contact synchronization server 115. Although FIG. 3 illustrates the index entries as numeric values, these index entries can be any type of information, including letter, symbols, etc.

Because the contacts and index information are stored in the contact synchronization server on a per user or per communication unit basis, these index entries can be reused for each user and/or communication unit. Accordingly, the index information of the present invention can be shorter than typical communication unit addresses. For example, while a SIP URI can be joe@network.com, index information of the present invention that corresponds to this SIP URI can be "1".

Figure 4:
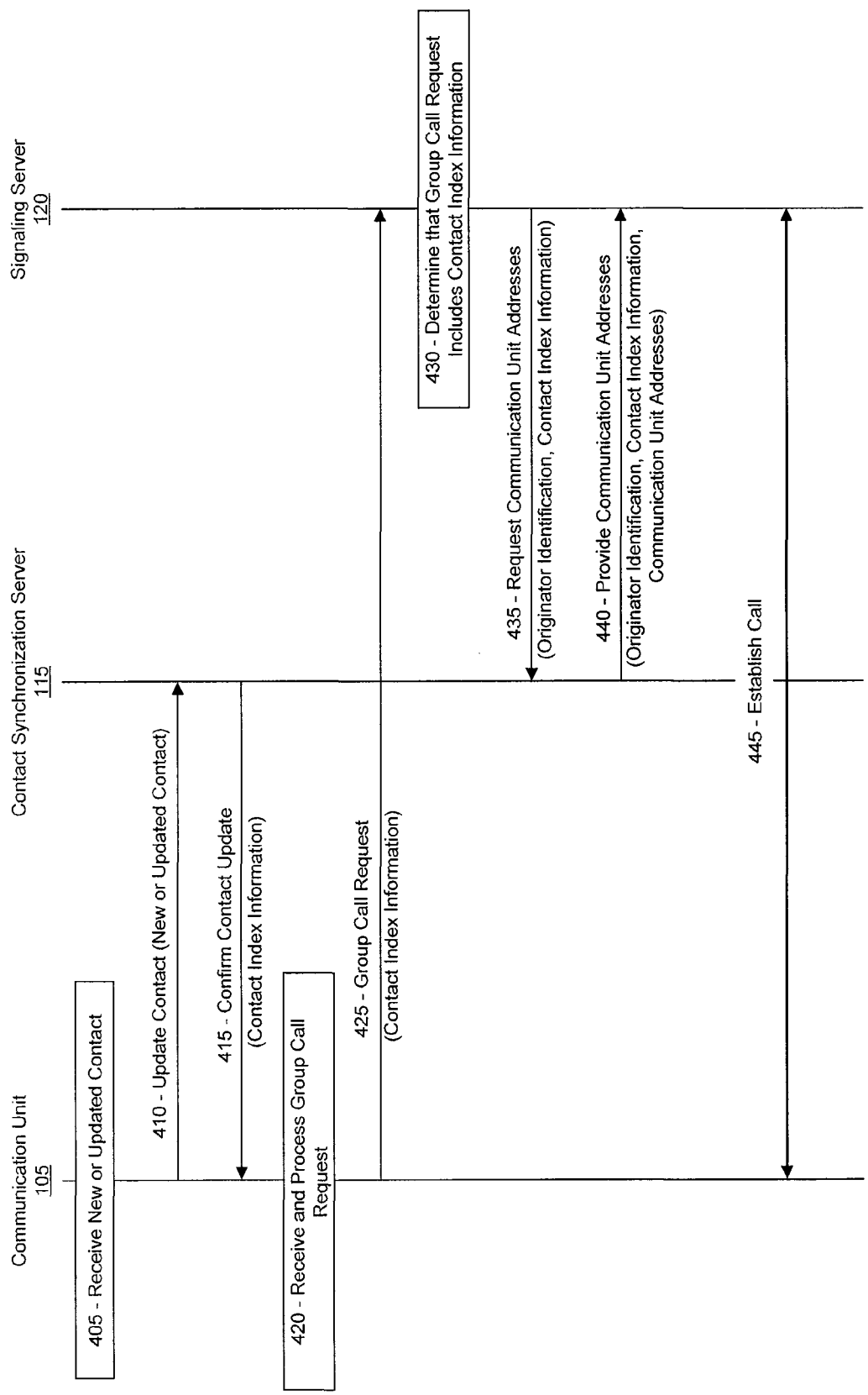
FIG. 4 is a call flow diagram of an exemplary method in accordance with the present invention.

FIG. 4 is a call flow diagram of an exemplary method in accordance with the present invention. When communication unit 105 receives a new contact or an update to an existing contact (step 405), logic 213 of communication unit 105 synchronizes the information with contact synchronization server 115 (step 410). The message sent from communication unit 105 can include the index information and either all of the contact information or only the updated information. Contact synchronization server 115 confirms the contact update to complete the synchronization process (step 415). In some embodiments, the index information can be assigned by contact synchronization server 115, and accordingly, for new contacts this information would not be sent in the first message from communication unit 105. It will be recognized that the contacts may not necessarily be synchronized in response to a new or updated contact, but instead or in addition, contacts can be updated on a periodic scheduled basis and/or after a predetermined number of changes or updates.

When logic 207 of communication unit 105 receives a group call request, logic 209 accesses contact list 255 (step 420). Logic 211 prepares and sends a group call request to signaling server 120 (step 425). The group call request includes the contact index information for each member of the group call, instead of using the full communication address of each member. For example, referring again to FIG. 3, assuming that the group call would include Contacts A, C and F, the group call request would include "1, 3, 6". Although commas are illustrated as separating index information, any type of information can be employed as a separator.

When signaling server 120 receives a group call request and determines that the request includes contact index information (step 430), the signaling server sends a request for communication unit addresses to contact synchronization server 115. This request includes an identification of the originator of the group call request and the index information. Contact synchronization server 115 responds with the communication unit addresses corresponding to each index information (step 440), and then signaling server 120 uses the communication unit addresses to establish the group call between communication unit 105 and other communication units that are not illustrated (step 445). It should be recognized that the establishment of the group call can involve additional signaling servers.

Although exemplary embodiments have been described in connection with group calls, the present invention can also be employed for one-to-one calls, also referred to as private calls. Moreover, although the present invention has been described as providing advantages in wireless communication systems, the present invention also reduces bandwidth, and can be employed, in wired communication systems. The present invention can be employed in a variety of different types of networks, including any type of push-to-talk network and/or an IP Multimedia Subsystem (IMS) network.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method of initiating a group call, the method comprising the acts of:
   receiving at a first communication device a request for a group call with a plurality of second communication devices;
   identifying at the first communication device index information which corresponds to a communication unit address of each of the plurality of second communication devices;
   transmitting to a signaling server a group call request comprising the index information; and
   engaging in a group call with the plurality of second communication devices established by the signaling server when the signaling server
      sends a request comprising an identification of the first communication device and the index information to a contact synchronization server,
      receives communication unit addresses of the plurality of second communication devices from the contact synchronization server in response to the request, and
      establishes the group call based between the first communication device and the plurality of second devices based on the received communication unit addresses.

2. The method of claim 1, further comprising the acts of:
   receiving at the first communication device a new communication unit address of a new second communication device;
   transmitting information for the new communication unit address to a contact synchronization server; and
   receiving confirmation of the new communication unit address from the contact synchronization server.

3. The method of claim 2, wherein the transmitted information for the new communication unit address includes index information corresponding to the new communication unit address.

4. The method of claim 2, wherein the confirmation includes index information corresponding to the new communication unit address.

5. The method of claim 1, wherein the communication unit address information comprises one of a telephone number, session initiation protocol (SIP) universal resource identifier (URI), universal fleet mobile identifier (UFMI), or electronic mail address.

6. The method of claim 1, wherein the group call request comprises a single short data burst (SDB) protocol data unit (PDU).

7. A communication unit, comprising:
a processor; and
a memory coupled to the processor, wherein the processor includes logic for receiving a request for a group call with a plurality of other communication units;
logic for identifying index information which corresponds to a communication unit address of each of the plurality of other communication units;
logic for transmitting a group call request comprising the index information, and
logic for engaging in a group call with the plurality of second communication devices established by the signaling server when the signaling server
sends a request comprising an identification of the first communication device and the index information to a contact synchronization server,
receives communication unit addresses of the plurality of second communication devices from the contact synchronization server in response to the request, and
establishes the group call based between the first communication device and the plurality of second devices based on the received communication unit addresses.

8. The communication unit of claim 7, wherein processor includes contact modification logic that receives new communication unit addresses or communication unit address updates and provides the new communication unit addresses or communication unit address updates to a contact synchronization server.

9. The communication unit of claim 7, wherein the memory includes a list of communication unit addresses and associated index information.

10. The communication unit of claim 9, wherein the list of communication unit addresses and associated index information are stored in a database in the memory.

11. The communication unit of claim 7, wherein the logic for receiving a request, for identifying index information and for transmitting the group call request is processor executable code loaded into the processor from the memory.

12. The communication unit of claim 7, wherein the group call request comprises a single short data burst (SDB) protocol data unit (PDU).

13. A method of initiating a group call, comprising:
receiving at a signaling server from a first communication device a group call request comprising index information corresponding to communication unit addresses of each of a plurality of second communication devices;
transmitting by the signaling server to a contact synchronization server a communication unit address request comprising the index information;
receiving at the signaling server from the contact synchronization server the communication unit addresses corresponding to the index information in response to the communication unit address request; and
establishing by the signaling server a group call with the first communication device and the plurality of second communication devices using the communication unit addresses received from the contact synchronization server.

14. The method of claim 13, wherein the communication unit address request comprises an identification of the first communication device and the index information.

15. The method of claim 13, wherein the group call request comprises a single short data burst (SDB) protocol data unit (PDU).

* * * * *